CONTINUOUSLY OPERABLE CUPOLA FURNACE FOR PRODUCING IRON HAVING A PREDETERMINED CARBON CONTENT
Filed Nov. 6, 1957
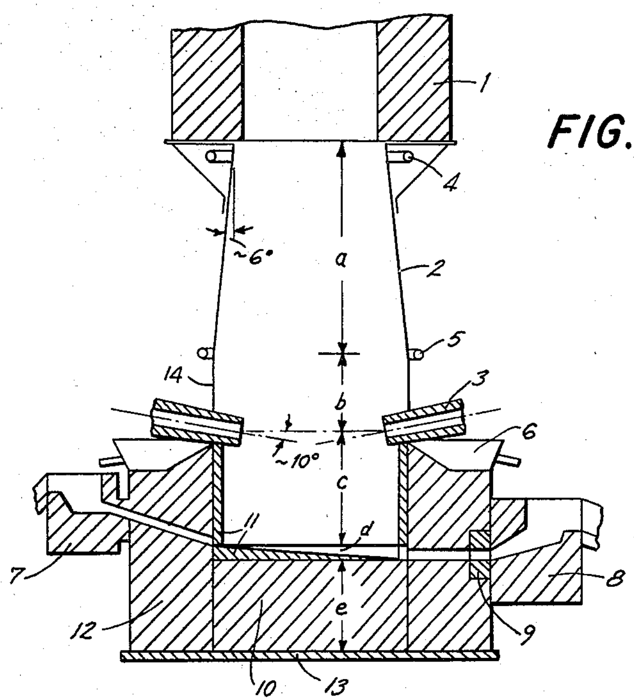
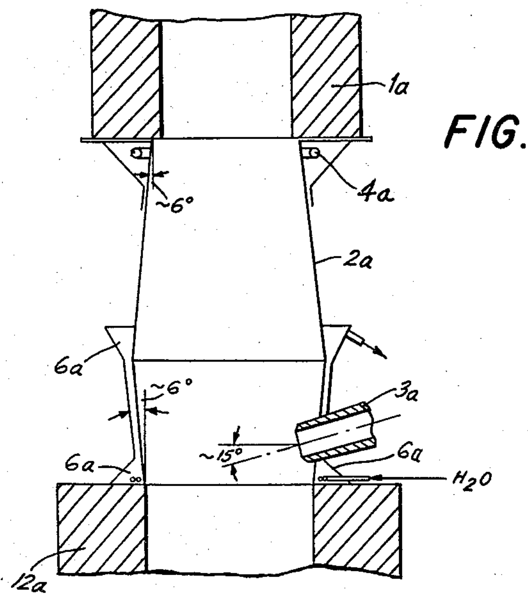
INVENTOR.
Ernst Löbbecke
BY
Michael S. Striker
Attorney 2,960,330

CONTINUOUSLY OPERABLE CUPOLA FURNACE FOR PRODUCING IRON HAVING A PREDETERMINED CARBON CONTENT

Ernst Löbbecke, Gummersbach, Germany, assignor to Strico Gesellschaft fur Metallurgie und Warmetechnik m.b.H., Gummersbach, Germany Filed Nov. 6, 1957, Ser. No. 696,305

Claims priority, application Germany Nov. 6, 1956

5 Claims. (Cl. 266—25)

The present invention relates to the metallurgy arts.

More particularly, the present invention relates to cupola furnaces for producing molten iron with either cold or heated air blasts, the molten iron being formed from pig iron, cast iron, steel scrap, and with or without the addition of ores, slags, or the like.

Cupola furnaces which operate with cold or hot blasts are known, and such furnaces have either acid or basic or carbonaceous linings, or they are watercooled with or without a lining in the melting zone. The discharge of iron and slag from such a furnace is either intermittent or continuous, and in the latter case certain known siphon-type devices are used for discharging the slag and iron. A common siphon device is generally used for both the iron and the slag, and in such common device the iron and the slag are maintained separate from each other. Cupola furnaces of this type are capable of operating continuously for approximately one week, and then the hearth of the furnace and above all the siphon-like discharge devices for the metal and slag must be newly lined or repaired, and for this purpose the operation of the furnace is necessarily interrupted.

For a relatively long time iron with a relatively high carbon content of between 3.2 and 4.0% carbon has been made in furnaces of the above type, this iron having a silicon content of 0.6 to 2.5% and a sulfur content of 0.02 to 0.20%. A relatively large amount of coke, a hot blast, and low combustion conditions (a reducing atmosphere within the furnace), as well as neutral to basic slag improve the operation and increase the carbon content of the iron while at the same time reducing the sulfur content.

Also, iron having an intermediate carbon content of from 2.8 to 3.2% carbon, 0.6 to 1.0% silicon (for example, malleable iron) have also been produced in such furnaces, which for these purposes are provided with an acid lining. The portion of the furnace which contacts the slag is maintained neutral or acid in correspondence with the lining of the cupola. The accuracy of the analysis of the iron produced in this way falls off with a decreasing carbon and silicon content of the iron.

It is not possible at the present time to accurately produce from a cupola furnace iron of low carbon content below 2.8% carbon, as well as low silicon content of less than 0.6%. When cupola furnaces are used in the production of such metals, they are used only to produce a molten metal which comes as close as possible to the desired analysis. A fine control of the composition of the iron of low carbon and silicon content is provided only by further treatment in a duplex process in a drum or electric furnace to which the molten metal is delivered from the cupola furnace, as well as in converters to which the molten metal is delivered from the cupola furnace.

The increasing requirements for inexpensive continuous production of low carbon iron, for example for the molten charge of a Siemens-Martin steel furnace connected with the cupola furnace and to which the molten metal is delivered from the cupola furnace, has not been possible with known cupola furnaces up to the present time. While it is possible with known installations to hold the silicon content, for example, even when operating continuously over a relatively long period of a week or so, within rather narrow limits, a control of the carbon content is possible only within relatively wide limits as long as the carbon content is not less than 3.0%. The above-referred to measures such as control of the material contacting the slag, the temperature of the air blast, etc. assists in providing a greater accuracy. However, other little or completely unknown factors can diminish the influence of the above controls and can reduce the accuracy of the contents of the iron produced in the cupola furnace.

It is an object of the present invention to provide a cupola furnace which is capable of reliably producing molten iron of low carbon content in an accurate predetermined manner.

Another object of the present invention is to provide a cupola furnace which is capable of operating continuously and at the same time is capable of providing a predetermined low carbon iron.

It is also an object of the present invention to provide a cupola furnace which is capable of controlling some of the factors referred to above which influence the product produced by the cupola and which up to the present time have been little or entirely unknown.

With the above objects in view, the present invention includes in a cupola furnace capable of providing iron of low carbon content, a cupola having an upper cylindrical portion of predetermined diameter and a frustoconical portion located directly beneath the upper cylindrical portion and having its smaller end located next to the upper cylindrical portion. The cupola of the invention includes a plurality of tuyeres, and a lower portion of the cupola carries the tuyeres. This lower portion of the cupola has a predetermined diameter directly beneath the tuyeres, and it extends from the tuyeres to the bottom end of the frustoconical portion of the cupola and has between the tuyeres and the frustoconical portion of the cupola a diameter at least as great as the diameter of the cupola directly beneath the tuyeres. In this way, as will be described below, it is possible to control the melting zone within the cupola and thus to control to a greater extent the composition of the iron produced in the cupola. The tuyeres terminate in the interior of the cupola along the circle whose diameter is approximately equal to the diameter of the upper portion of the cupola.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a partly schematic fragmentary elevational view taken in a sectional plane which includes a central axis of the cupola and showing features of a cupola constructed according to the present invention; and Fig. 2 is a fragmentary elevational sectional partly schematic view of another embodiment of a cupola according to the present invention.

It is apparent that factors in addition to the guiding of the slag and control of the temperature of the air blast influence the product produced by a cupola furnace. One of the factors recognized by the present invention is the distance between the melting zone of the cupola and the point at which the molten iron leaves the cupola. Where these distances are different the iron has different carbon contents. Any influence on the melting zone such as influence with respect to its size or its elevation over the tap hole for the iron must therefore be additionally controlled in order to be able to provide an iron of preselected carbon content.

To understand the necessary measures which control the composition of the product, the essential factors for the control of the melting zone in the cupola must be recognized. In cupolas which operate with a cold air blast and which have a conventional cylindrical shape, the height of the melting zone above the tap hole for the iron is necessarily determined by the length of the necessary path of movement of the air at the atmospheric temperature of 20° C., for example, which is necessary to raise the temperature of this air which enters through the tuyeres while the air passes over the glowing coke to a temperature of 630° C., which is the ignition temperature for the coke. Differences in the ease with which gas is capable of passing through the charge, such as differences in the size of the particles of coke, as well as variations in the cooling at the walls of the cupola, etc., can greatly influence the position and shape of the melting zone. Therefore, every cupola furnace melts differently with the same melting controls. When a hot blast is used then the size of the melting zone diminishes and it becomes located nearer to the tuyeres, and the above factors such as the ease with which gas is capable of passing through the chrage, etc., have here also a similar influence on the form of the melting zone, as in the case of a cold blast, even if this influence is perhaps not so pronounced inasmuch as the path of movement of the hot blast required to raise it to 630° C. is much shorter. Inasmuch as there is with a given cupola furnace a predetermined fixed elevation for the floor of the furnace as well as for the tap holes thereof, it necessarily follows that changes in the characteristics of the melting zone such as the size thereof and the distance thereof from the tap holes result in different carbon contents of the molten metal where other operating factors are maintained constant. A number of other factors also have some influence on the product, but these factors are negligible, and only the significance of wind or blast velocity in the tuyeres is referred to below.

Referring now to the drawing, Fig. 1 shows schematically a cupola furnace according to the present invention which has an unlined, water-cooled melting zone. The tuyeres 3 are water-cooled and are carried by the relatively short lower cylindrical portion 14 of the cupola, and this cylindrical portion 14 of the cupola is connected with the bottom end of a frustoconical portion 2 of the cupola which extends upwardly from the cylindrical portion 14 and has its top, smaller end located next to an upper cupola portion 1 of predetermined diameter. The tuyeres 3 terminate in the interior of the cupola along a circle whose diameter is substantially equal to the diameter of the upper cupola portion 1. These tuyeres are water-cooled, and in addition spray tubes 4 and 5 surround the cupola to cool the portions 2 and 14 thereof, respectively. The cooling water sprayed from the rings 4 and 5 in a known way through openings thereof onto the exterior surface of the unlined cupola is collected in a suitable trough 6 and is guided away from the trough 6 in any suitable way. This trough is so constructed that its inner periphery is located directly next to the tuyeres. Thus, as may be seen from Fig. 1, the inner upper periphery of the trough 6 is located directly at the underside of the tuyeres 3, and from its inner upper periphery the upwardly directed surface of the trough 6 slopes downwardly away from the tuyeres and cupola wall so that the cooling water collected in the trough 6 is maintained distant from the interior of the cupola. In this way an undesirable cooling of the hearth particularly at the portion thereof where the slag is located is avoided, and a desirable cooling only starts to take place when at this sensitive portion of the cupola a predetermined erosion of the cupola lining has taken place.

The cupola hearth can be provided with a relatively thick lining, as shown in Fig. 1, or it may be cooled in a known way. The lining material may be a carbonaceous fire-resistant material, or a fire clay which has been stabilized with graphite and which is in the form of pressed blocks, for example. Also, carbon blocks located directly next to each other without any gaps therebetween may be used. The floor of the hearth may be lined with blocks which are either capable of being lowered or capable of being maintained stationary. The above materials are suitable for lining the floor, and also magnesite may be used to line the floor. The side walls and floor of the hearth are provided with a fire clay, wear-resistant lining when the cupola is started as well as each time the cupola is stopped, and a discharge gutter 11 for the iron is set into the floor layer of fire-resistant material.

A slag discharge means 7 and a molten metal discharge means 8 of the siphon-operating type are provided on the cupola of the invention, and in accordance with the invention these discharge means are angularly displaced from each other about the axis of the cupola through approximately 180°, as indicated in Fig. 1. The size of the discharge passage for the iron where the hearth is lined with carbonaceous material is maintained constant by a suitable block 9 at the exterior wall of the cupola, and magnesite may be used for the block 9. The iron discharge means may be lined with fire clay or magnesite where iron of relatively low carbon content is obtained, while a carbonaceous lining material may be used with iron of high carbon content. The slag tap hole as well as the remainder of the slag discharge means can be entirely composed of carbonaceous material, at least at those portions which come in direct contact with the slag. For relatively short operating periods of a week, for example, a fire clay stabilized with graphite may also be used for the slag discharge means at those portions thereof which contact the slag. Both the iron and the slag discharge means are capable of being removed from the cupola, so that in this way certain operations may be carried out without stopping the operation of the cupola. Additional details such as the inclinations and angular relationships of the parts are indicated in Fig. 1.

As an example of the dimensions of a cupola furnace according to the present invention, the following proved values may be used: The inclination of the tuyeres may be 15° with respect to a horizontal plane, and the speed of the air movement in the tuyeres (N cb. m.) should be 60 m./s. The diameter of the hearth, which is to say the diameter of the portion of the cupola below the tuyeres should be 2000 mm., and the dimensions *a*, *b*, *c*, *d* and *e* shown in Fig. 1 may be 1800 mm., 350 mm., 750 mm., 110 mm., and 1000 mm., respectively. The carbon content of the iron produced from this cupola is less than 2.8%, and the silicon content is less than 0.3%.

In the embodiment of the invention which is illustrated in Fig. 2 all of the parts which correspond to those of Fig. 1 are indicated with the same reference characters followed by the letter *a*. Thus, as may be seen from Fig. 2 the tuyeres **3*a* have an inclination of 15°, as pointed out above. The embodiment of Fig. 2 differs principally from that of Fig. 1 in that the portion of the cupola which carries the tuyeres is also frustoconical and extends from the tuyeres upwardly to the frustoconical portion 2*a*, with the largest end of the frustoconical portion of the cupola which carries the tuyeres being located directly next to the bottom end of the frustoconical portion 2*a*. The trough 6*a* also is different from the trough of Fig. 1 in that it extends to a greater height along the cupola and serves to maintain liquid from the spray ring 4*a* at the portion of the cupola which carries the tuyeres, and Fig. 2 shows the discharge for the water collected by the trough 6*a*. In Fig. 2 the thick lining 12*a* for the cupola hearth is indicated, while the corresponding lining 12 is indicated in Fig. 1, where the floor 10** of the cupola also is shown.

Instead of using water cooling for the cupola wall as described above and shown in the drawings, it is also possible to retain the cupola profile of the present invention while using a known hot cooling system. The cupola of the invention is capable of being varied in its construction so as to be adapted for the continuous operation to produce all types of iron, and furthermore it may be used for treatment of iron ores.

With the above-described construction of the present invention, a continuously operable cupola furnace is provided which at the same time is capable of controlling the carbon content particularly with low carbon iron, and with the structure of the invention the following requirements are fulfilled:

(1) The elevation of the melting zone and its volume are predetermined.

(2) The time of contact of the liquid iron with glowing coke is controlled.

(3) An accurate metallurgical control of the cupola furnace is provided by control of the slag.

(4) An operating time of a week without interruption is guaranteed.

(5) The adjustment and maintenance of controlled thermal relationships within the cupola furnace for a melting period of any desired time is obtained.

The first of the above requirements, namely, the control of the melting zone is brought about by the shape of the cupola, which is to say the cupola profile. It has been found that where the cupola has directly above the tuyeres a relatively short cylindrical portion or a relatively short frustoconical portion which increases in diameter upwardly away from the tuyeres, as shown in Figs. 1 and 2, respectively, and this portion is then connected to the bottom end of another frustoconical portion which diminishes in cross section as it approaches the upper portion of the cupola, the melting zone formed at the junction between these two cupola portions, which is to say the cupola portions 2 and 14 of Fig. 1 and the cupola portions **2*a* and 14*a*** of Fig. 2, remains practically unchanged for any length of melting time, even if because of operating factors the melting requirements such as amount of air, amount of coke, and basicity of the slag change while the air temperature remains constant. The use of a hot air blast simplifies the fulfilling of the first of the above requirements, but is not essential since with corresponding dimensions of the individual parts of the cupola a cold air blast will also produce the same effect. The tuyeres are inclined in accordance with the requirements of the product to be derived from the cupola, and the choice of the proper air speed in the tuyeres in accordance with the diameter of the cupola promotes the fulfillment of the first of the above requirements.

With this possibility provided by the present invention to control the melting zone, the esssential factors for fulfilling the second requirement, namely, the control of the contact time between the iron and the glowing coke is capable of being fulfilled. Depending upon the desired carbon content of the iron, the contact time of the iron with the carbon may be controlled by choosing a proper depth for the hearth. Thus, where the hearth is relatively deep there will be a relatively long contact time between the iron and glowing carbon, and thus an iron with a high carbon content will be provided, while with a relatively shallow hearth an iron of correspondingly low carbon content will be provided.

One of the important requirements for providing a low carbon iron from a cupola of the above type is that the iron should not be permitted to collect in the interior of the hearth, but instead should be removed from the hearth as soon and as quickly as possible so as to be separated from the slag as soon as possible. The siphon-type of iron and slag discharge means are capable of accomplishing this result. By providing separate iron and slag discharge means in accordance with the present invention, several advantages are obtained. In the first place it is possible to use for the iron discharge means materials which are particularly resistant to the molten iron, and for the slag discharge means materials which are particularly resistant to the slag, so that the inevitable corrosion of the materials where a common discharge means is used is avoided, since in such a common discharge means a material which resists the slag could not resist the iron, and vice versa. Furthermore, with this arrangement it is possible to locate the tap hole for the iron so low in the cupola that the molten iron immediately flows out of the same. Thus, the lowest part of the opening of the slag tap hole at the interior of the cupola is located at least at as high an elevation as the highest part of the opening of the tap hole for the iron at the interior of the cupola. With these discharge means a continuous operation of the cupola is possible. The two discharge means may be water-cooled.

The water or heat-cooled lining-less cupola wall at the melting zone as well as the constant temperature of the air blast provides an accurate metallurgical control of the operation of the cupola as well as the possibility of providing continuous operation, and the cooling of the cupola as well as the maintenance of a constant air temperature are easily adapted to the cupola of the present invention.

It will be understood that each of the elements described above, or two or more together, may also find a useful application in other types of cupolas differing from the types described above.

While the invention has been illustrated and described as embodied in iron producing cupolas, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a cupola furnace for producing iron of preselected carbon content, in combination, an upper cylindrical cupola portion of predetermined diameter; a frustoconical unlined cupola portion located beneath and next to said upper cupola portion, said frustoconical cupola portion having one end of a smaller diameter than its opposite end located next to said upper cupola portion; a plurality of tuyeres; a lower unlined cupola portion carrying said tuyeres and having directly beneath said tuyeres a predetermined diameter, and said lower cupola portion having directly above said tuyeres and extending from said tuyeres to said frustoconical cupola portion a diameter at least as great as the diameter of the cupola directly beneath said tuyeres, said tuyeres terminating in the interior of the cupola along a circle whose diameter is approximately equal to the diameter of said upper portion of said cupola.

2. In a cupola furnace for producing iron of preselected carbon content, in combination, an upper cylindrical cupola portion of predetermined diameter; a frustoconical unlined cupola portion located beneath and next to said upper cupola portion, said frustoconical cupola portion having one end of a smaller diameter than its opposite end located next to said upper cupola portion; a plurality of tuyeres; a lower unlined cupola portion carrying said tuyeres and having directly beneath said tuyeres a predetermined diameter, and said lower cupola portion having directly above said tuyeres and extending from said tuyeres to said frustoconical cupola portion a diameter at least as great as the diameter of the cupola directly beneath said tuyeres, said tuyeres terminating in the interior of the cupola along a circle whose diameter is approximately equal to the diameter of said upper portion of said cupola; slag discharge means and molten metal discharge means connected to the portion of the cupola which extends below said tuyeres, said slag and molten metal discharge means being angularly displaced with respect to each other about the axis of the cupola and said slag and molten metal discharge means respectively having a pair of openings at the interior of the cupola communicating with the interior thereof, the opening of the slag discharge means having a lowermost point which is at least as high as the highest point of the opening of the molten metal discharge means.

3. In a cupola furnace as recited in claim 1, said lower cupola portion being cylindrical.

4. In a cupola furnace as recited in claim 1, said lower cupola portion also being frustoconical and having its larger end joined to the lower end of said first-mentioned frustoconical cupola portion.

5. In a cupola furnace, in combination, an upper cylindrical cupola portion of predetermined diameter; an intermediate unlined cupola portion located beneath and next to said upper cupola portion and having a minimum diameter greater than said predetermined diameter of said upper cylindrical cupola portion; a lower cupola portion located under said intermediate cupola portion and having a diameter larger than said predetermined diameter of said upper cylindrical cupola portion; a plurality of tuyeres carried by said lower cupola portion projecting into the same, said tuyeres terminating in the interior of the cupola along a circle whose diameter does not exceed said predetermined diameter of said upper cupola portion, whereby the flame emanating from said tuyeres passes into said upper cupola portion without substantially affecting the surface of said intermediate unlined cupola portion.

References Cited in the file of this patent

UNITED STATES PATENTS

| | | |
|---|---|---|
| 2,136,360 | Clair | Nov. 15, 1938 |
| 2,851,350 | Tardieu | Sept. 9, 1958 |

FOREIGN PATENTS

| | | |
|---|---|---|
| 2,834 | Great Britain | Feb. 23, 1887 |
| 3,141 | Great Britain | Dec. 13, 1861 |
| 450,491 | Great Britain | July 20, 1936 |